(12) United States Patent
Corte

(10) Patent No.: US 9,638,333 B1
(45) Date of Patent: *May 2, 2017

(54) METHOD AND APPARATUS FOR A CHOKE VALVE AND OPERATION OF A CHOKE VALVE

(71) Applicant: Cortec, L.L.C., Houma, LA (US)

(72) Inventor: Bobby Corte, Houma, LA (US)

(73) Assignee: Cortec, L.L.C., Houma, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/083,928

(22) Filed: Mar. 29, 2016

Related U.S. Application Data

(63) Continuation of application No. 14/071,015, filed on Nov. 4, 2013, now Pat. No. 9,297,458.

(60) Provisional application No. 61/752,168, filed on Jan. 14, 2013.

(51) Int. Cl.
| | |
|---|---|
| *F16K 27/02* | (2006.01) |
| *F16K 1/32* | (2006.01) |
| *E21B 34/02* | (2006.01) |
| *F16K 31/00* | (2006.01) |

(52) U.S. Cl.
CPC ............... *F16K 1/32* (2013.01); *E21B 34/02* (2013.01); *F16K 27/02* (2013.01); *F16K 31/00* (2013.01)

(58) Field of Classification Search
CPC . F16K 27/02; F16K 27/0254; Y10T 137/5983
USPC ............... 137/315.02; 251/1.3, 282, 366
See application file for complete search history.

(56) References Cited

U.S. PATENT DOCUMENTS

| | | | |
|---|---|---|---|
| 4,240,609 A | 12/1980 | Hahn et al. |
| 4,272,055 A | 6/1981 | Herd |
| 4,311,297 A | 1/1982 | Barrington |
| 5,386,965 A | 2/1995 | Marchal |
| 7,331,562 B2 | 2/2008 | Springett |

*Primary Examiner* — Matthew W Jellett
(74) *Attorney, Agent, or Firm* — Garvey, Smith, Nehrbass & North LLC; Brett A. North

(57) ABSTRACT

A choke valve comprising: a body having an axial through hole and a radial entry port; a valve seat coaxially housed in the body axial through hole on a first side of the radial entry port; a pressure balanced valving member axially reciprocable within the body axial through hole between a first sealing position bearing against the valve seat and a second position spaced away from the seat; an actuator housing operably connected to the valving member; and a detachably connected reinforcement member detachably connected to the actuator housing and increasing the axial load that the actuator housing can take before failure of the actuator housing.

8 Claims, 17 Drawing Sheets

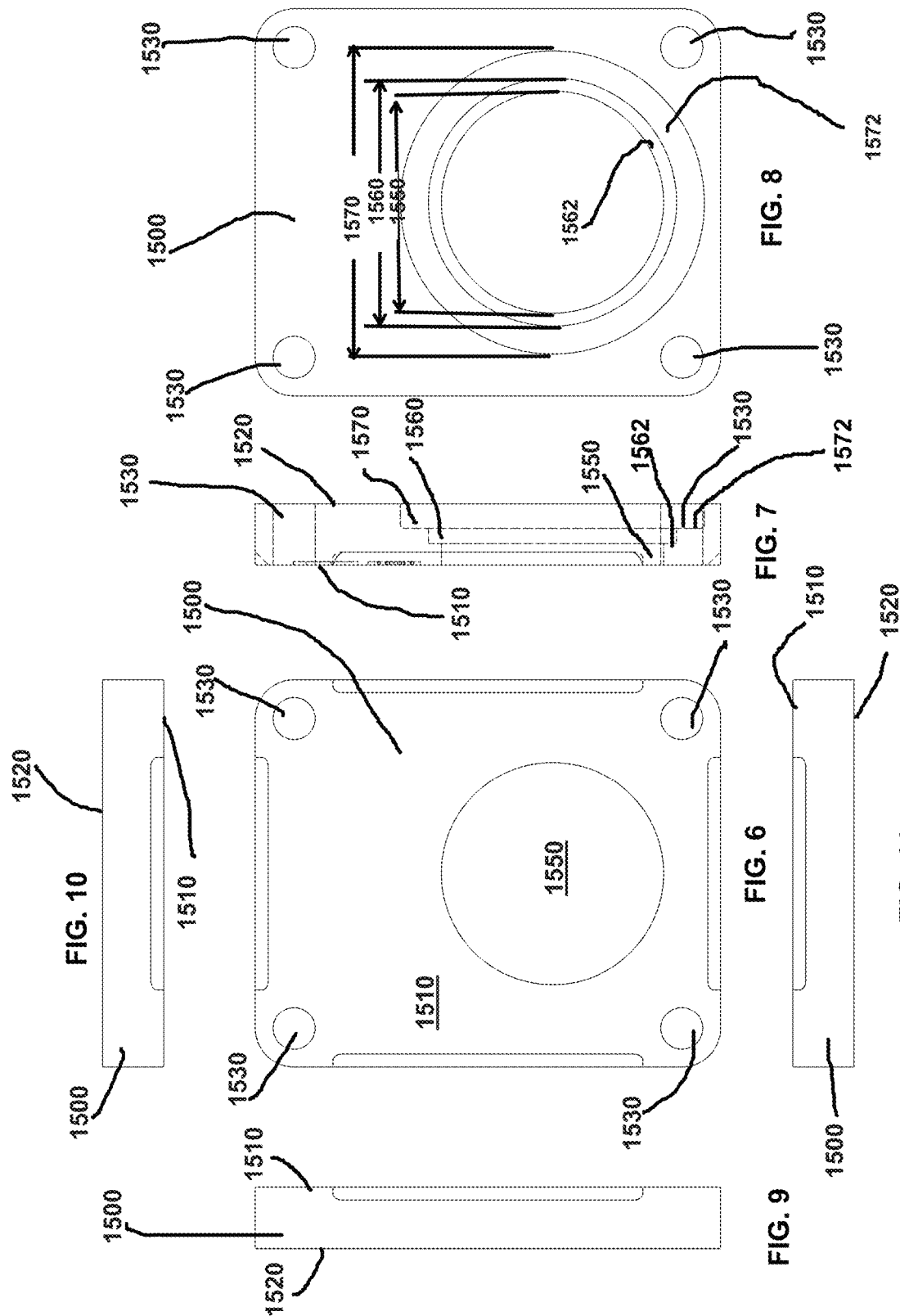

METHOD AND APPARATUS FOR A CHOKE VALVE AND OPERATION OF A CHOKE VALVE

CROSS-REFERENCE TO RELATED APPLICATIONS

This is a continuation of U.S. patent application Ser. No. 14/071,015, filed Nov. 4, 2013 (now U.S. Pat. No. 9,297, 458, issuing on Mar. 29, 2016), which claims benefit of U.S. Provisional Patent Application Ser. No. 61/752,168, filed on Jan. 14, 2013, which applications are incorporated herein by reference and priority to/of such applications are hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

One embodiment relates to an apparatus and method for providing relief and/or reinforcement to a hydraulic choke valve from exposure to excessive backpressure. More particularly, one embodiment relates to pressure reducing valves and valve openings having secondary reinforcing members.

One embodiment can be applicable to hydraulic choke valves, which are a subclass of pressure reducing valves. Choke type pressure reducing valves generally function by causing a portion of the potential energy of a pressurized fluid to be dissipated through turbulence when the pressurized fluid is passed through a restrictive orifice. Typically, the orifice of a choke valve is selectably variable through reciprocation of its valving member toward and away from the valve seat, so that a desired combination of flow and exit pressure may be obtained.

A choke valve is normally open and is designed for one-way flow. This construction differs from that of a relief valve, which is another type of one-way flow valve that is normally closed. The present invention is applicable to a choke valve that differs in construction from the most common arrangement of such valves in having its flow gate pressure-balanced. Because of the pressure balancing of the sealing plug, the actuating loads on the stem of the flow gate are considerably reduced compared to those of most choke valves of comparable capacity. However, the stem of the flow gate, which connects to the reciprocable control screw of the actuator used to reciprocate the flow gate for this type of choke, is not pressure balanced causing possibly substantially increased loading on such stems and the housings supporting such stems.

In one embodiment excessive axial loading is reinforced and/or assumed by a detachably connectable reinforcing member which is attached to the primary housing of the valve body.

Excessive axial loading on valve plugs has been addressed using shearable relief means of opening a relief valves on single time basis using a shearing member which must be repaired after a shearing event. Schmidt et al. U.S. Pat. No. 7,124,770 discloses a mechanism for preventing damage to the actuator of a hydraulic choke valve in the event of excessive backpressure on the outlet of the choke which uses a shearable means to connect the reciprocable control shank of the actuator to the throttling valve member of the choke valve where in the event of excessive pressure on the exit channel of the choke valve, the shearable means will shear, thereby fully opening the valve and permitting the excessive pressure to escape. However, each time the shearing means is used, the valve must be taken out of commission so that the shearing means can be replaced.

The above prior art solution require modifications to the stems and actuators, along with rebuilding same after failure necessitating taking the valves with such solutions out of service in the event of a failure.

SUMMARY

The invention contemplates a simple, easy means to increase the maximum pressure that a particular choke valve actuator can address before the actual body overloads and fails.

One embodiment provides a choke valve comprising:

a body having an axial through hole and a radial entry port;

a valve seat coaxially housed in the body axial through hole on a first side of the radial entry port;

a pressure balanced valving member axially reciprocable within the body axial through hole between a first sealing position bearing against the valve seat and a second position spaced away from the seat;

a detachably connected reinforcement member detachably connected to the valve body and increasing the axial load that the valve valving member can take before failure of the valve body.

One embodiment provides a choke valve comprising:

a body having an axial through hole passing from a first side of the body to a second side of the body, an outlet passageway coaxially aligned with the through hole and positioned at the first side of the body, and a radial inlet port intersecting the through hole between the first and second sides of the body;

a valve seat coaxially housed in the through hole between the inlet port and the outlet passageway; a pressure balanced valving member axially reciprocable within the through hole between a first position bearing against the valve seat and a second open position spaced away from the valve seat;

an actuator attached to the second side of the body, the actuator having an axially reciprocating actuator shank for reciprocably moving the valving member between the first position and the second position;

an actuator reinforcing member detachably connected to the actuator housing, the reinforcing member comprising a plate section with an opening allowing the actual housing to partially extend therethrough; and a first end of the stem positioned in a socket in one end of the actuator shank; whereby whenever the actuator shank is subjected to a fluid pressure in excess of a predetermined value from the outlet passageway the actuator reinforcing member will reinforce the body of the actuator.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

The drawings constitute a part of this specification and include exemplary embodiments to the invention, which may be embodied in various forms.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIGS. 6 through 11 are various views of the plug drive reinforcement plate to minimize the type of failures shown in FIG. 5.

DETAILED DESCRIPTION

Figure 1:
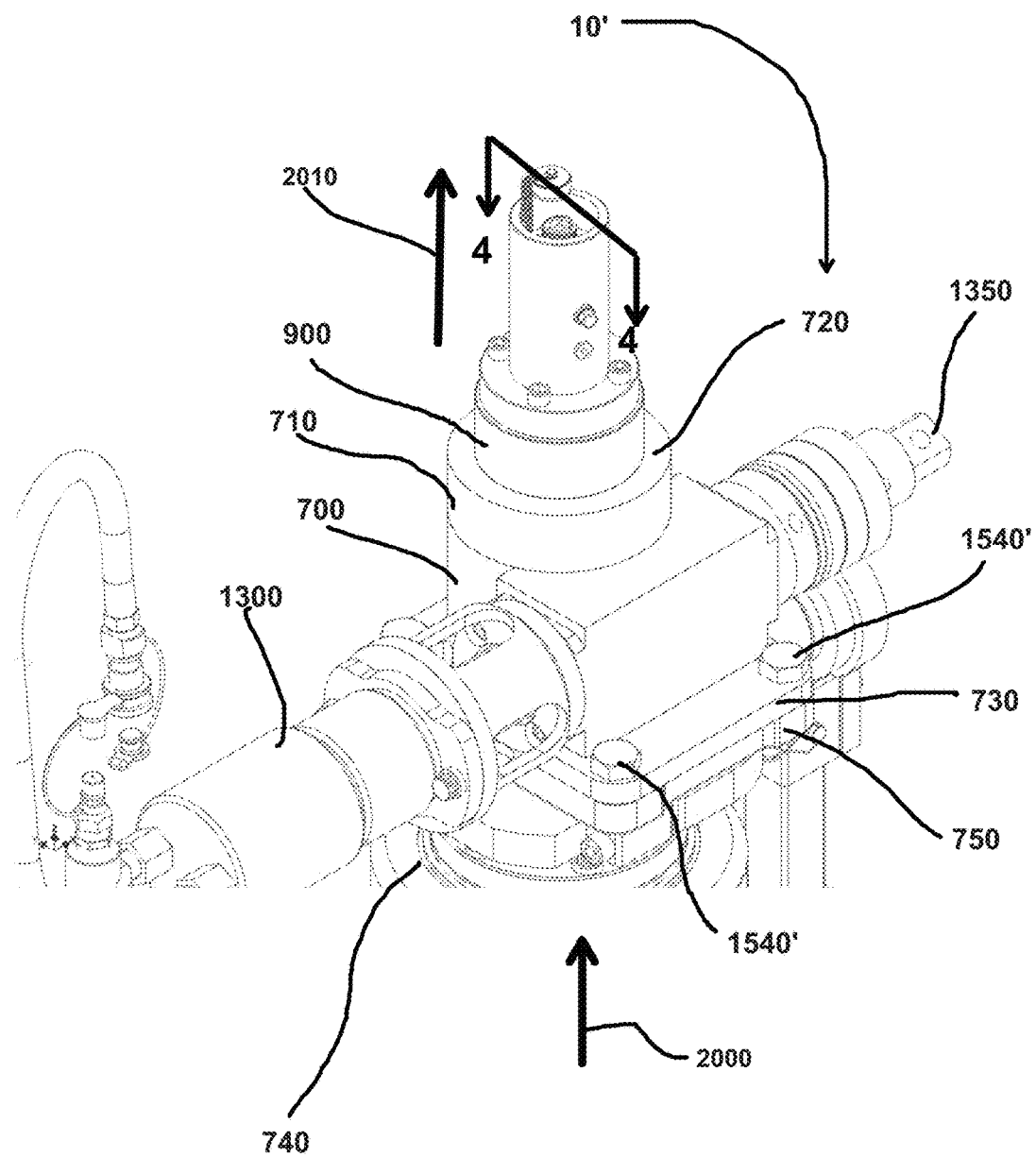
FIG. 1 is a perspective view of an actuator detachably connected to a choke valve body.

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

The present invention provides a mechanism absorbing excessive backpressure acting on the plug 400 of a choke valve 100 before overloading either the body 710 of the plug drive system 700 and/or its bonnet 900.

Shown in the Figures is an assembled hydraulic choke valve system 10 consisting of a hydraulic choke valve 100 and an electrically or manually powered actuator 1300. Herein, the term "hydraulic choke" is taken to refer to the fact that the device is used with a variety of fluids, such as drilling mud, salt water, oil, gas, and other chemicals which may be injected into a well. "Hydraulic" does not herein refer to the choke actuation means. Although the materials of construction of choke valve 100, plug drive system 700, and actuator 1300 may vary, typically they are constructed of a high strength low alloy steel, mild steel, or, in the case of O-rings and other elastomeric seals, Viton™ or nitrile rubber.

Figure 2:
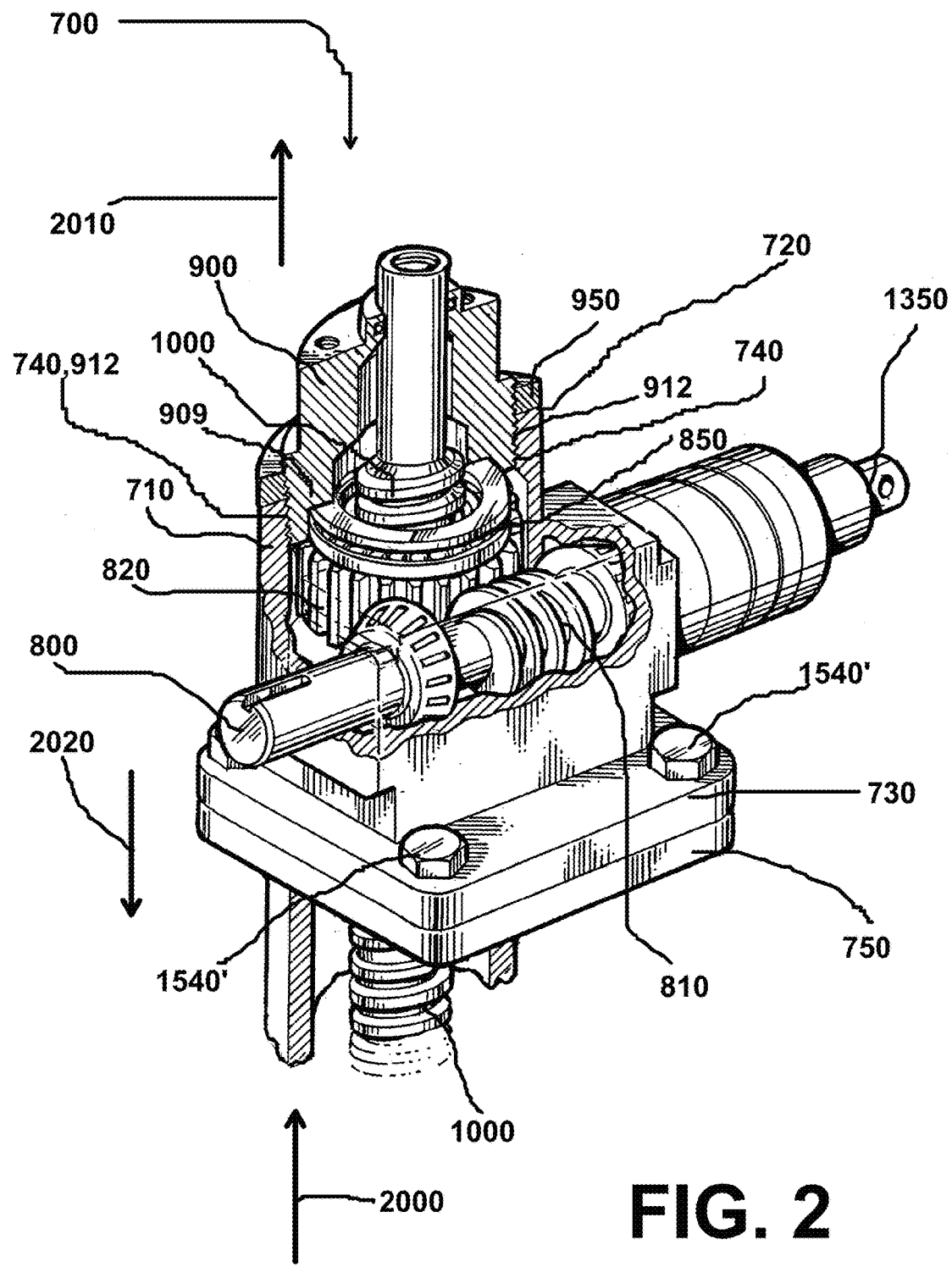
FIG. 2 is a cutaway perspective view of a plug drive system which operatively connects the primary actuator shank drive to the choke plug.
Figures 3, 3A:
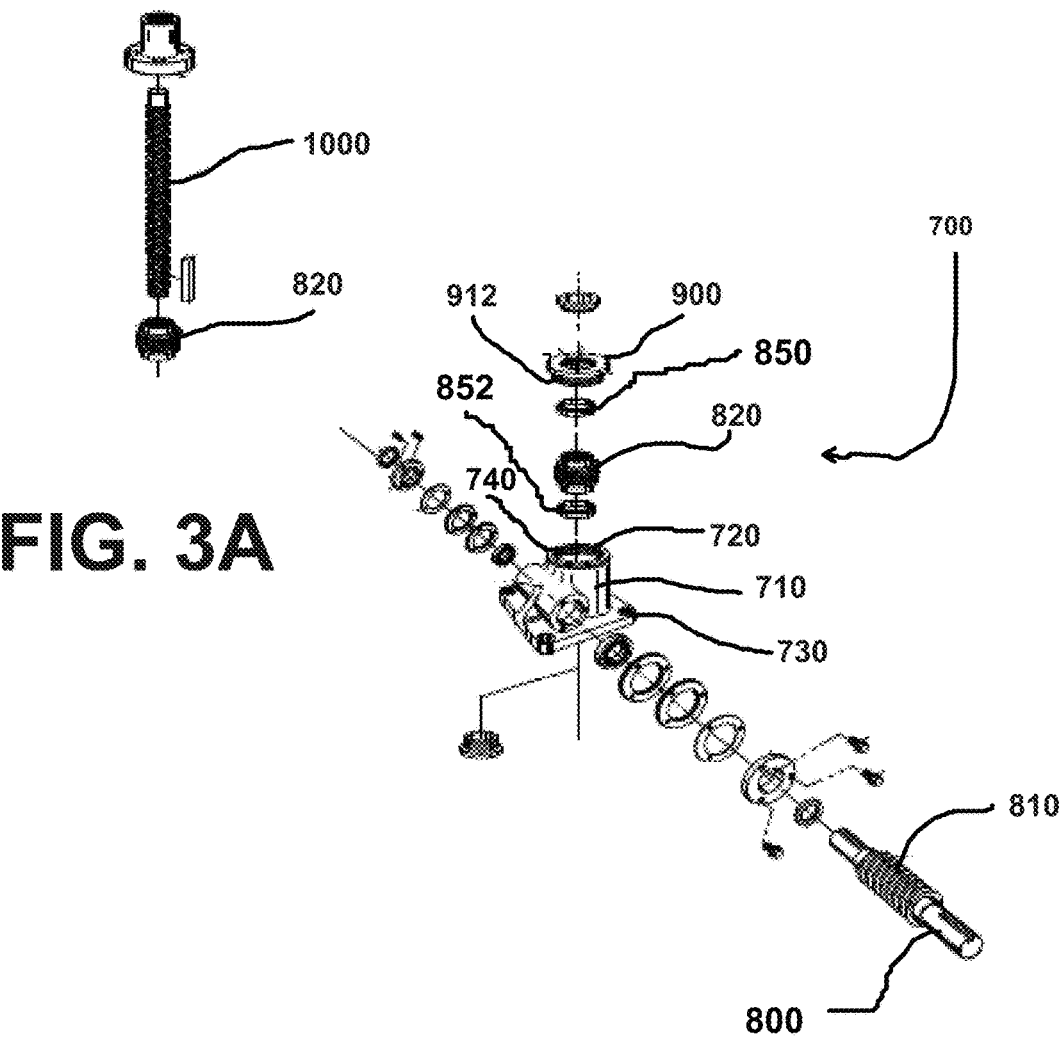
FIG. 3 is an exploded view of the plug drive system of FIG. 2.
FIG. 3A is an enlarged exploded perspective view of the axial shaft and driver gear.

FIG. 1 is a perspective view of an actuator 1300 detachably connected to plug primary drive 700 which itself is connected to a choke valve body 200. FIG. 2 is a cutaway perspective view of a plug drive system 700 which operatively connects the primary actuator drive 700 to the choke plug 400. FIG. 3 is an exploded view of the plug drive system 700.

Figure 4:
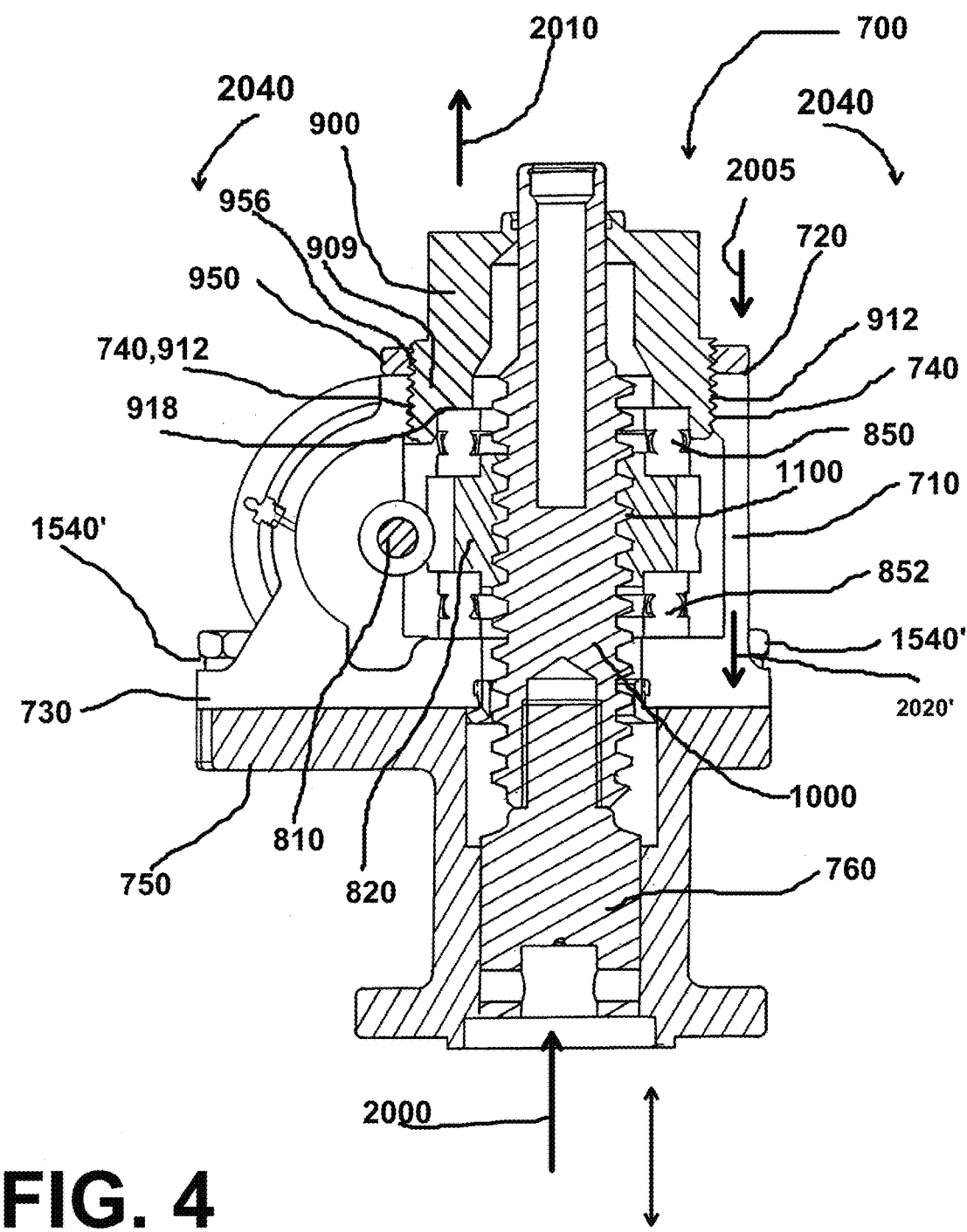
FIG. 4 is a sectional view of the plug drive system of FIG. 1 taken through the lines 4-4.
Figure 5:
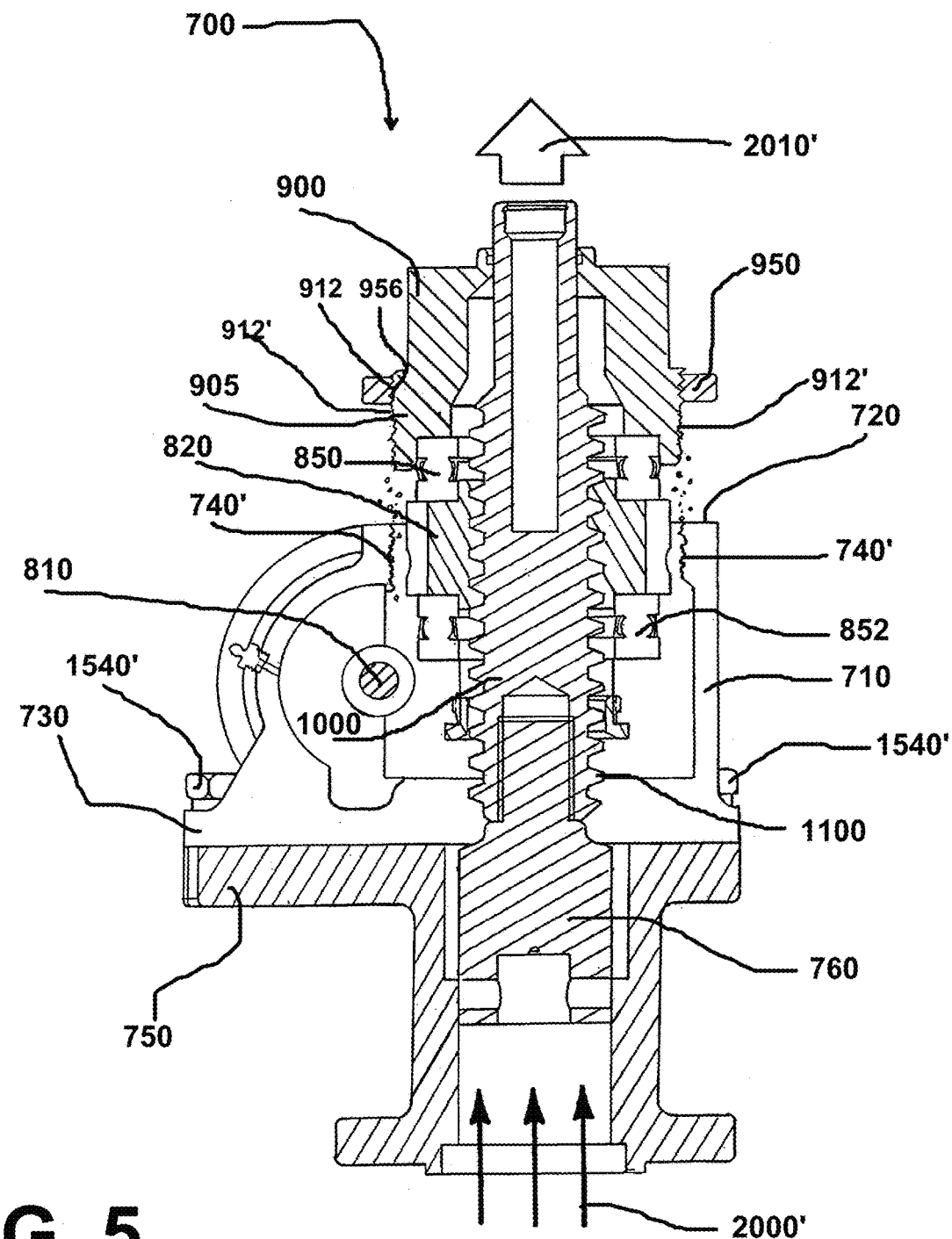
FIG. 5 shows the view of FIG. 4 where the bonnet of the plug drive system has failed with respect to the body of the plug drive system.
Figure 12:
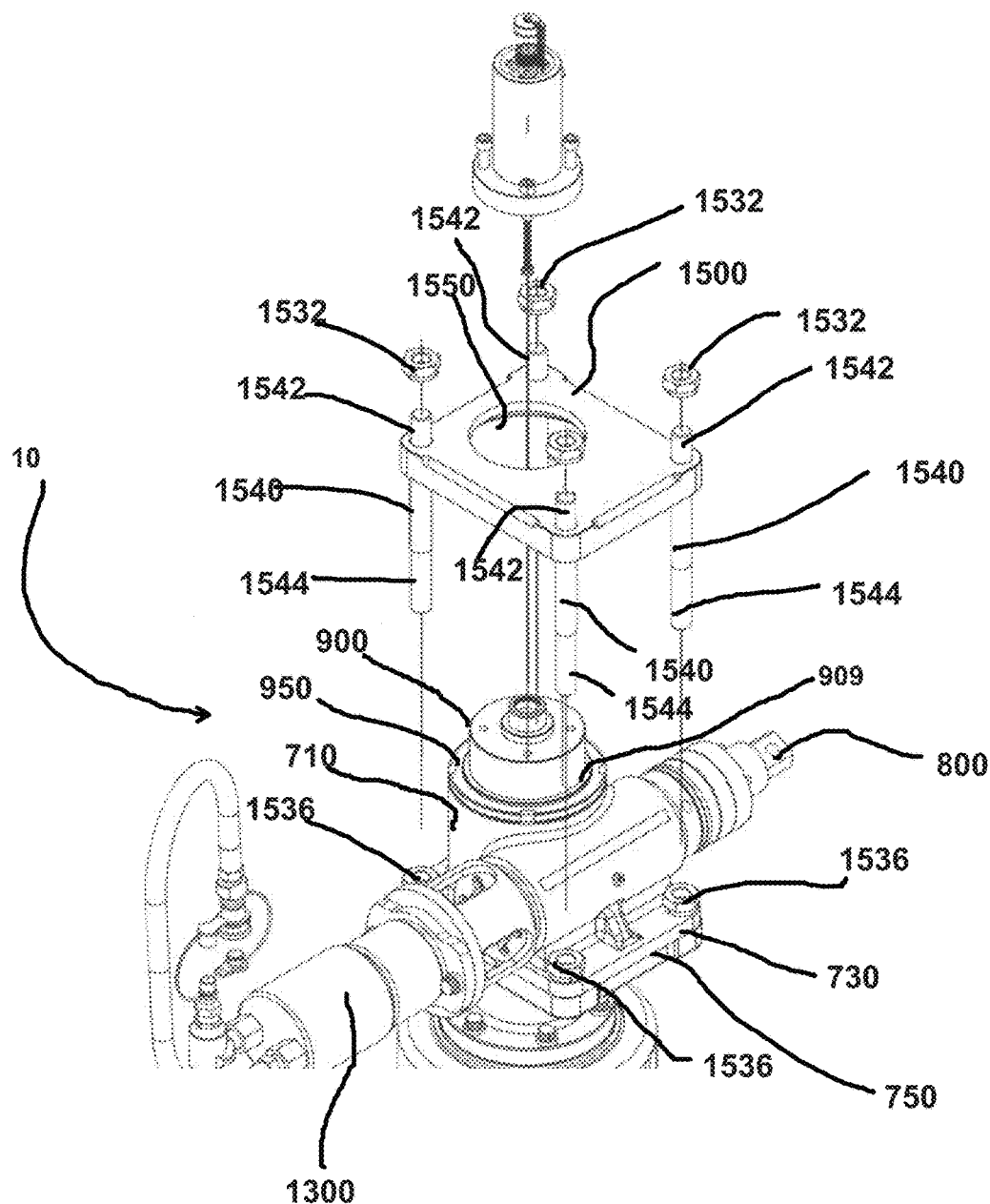
FIG. 12 is an exploded perspective view of a reinforcement plate being detachably connected to the plug drive system of FIGS. 1 and 2.

FIGS. 4 and 5 schematically illustrate a catastrophic failure based on excessive axial loading 2000. FIG. 4 is a sectional view of the plug drive system 700 taken through the lines 4-4. Here force 2000 travels up through axial shaft 1000 which is transferred to driven gear 820 which is transferred to upper bearing 850 which is transferred to bonnet 900 (vial enlarged area 909) which is transferred to body 710 through the interaction of threads 740 and 912. The transfer of force to body will tend to cause upper portion 720 of body to extend vertically (schematically indicated by arrow 2010) along with expanding outwardly (schematically indicated by arrows 2040) which expansion decreases the strength of the connection between threads 740 and 912. FIG. 5 shows the view of FIG. 4 where the bonnet 900 of the plug drive system 700 has failed with respect to the body 710 of the plug drive system 710. This type of failure would be a catastrophic failure as bonnet 900 and shaft 1000 can continue to move in the direction of arrow 2010' leaving open the interior of the choke valve and allowing fluid to freely flow outside of the valve.

FIGS. 6 through 11 are various views of the plug drive reinforcement plate 1500, which as described below can be used to reinforce and absorb excessive backpressure acting on the plug 400 of a choke valve 100 before overloading either the body 710 of the plug drive system 700 and/or its bonnet 900. Plate 1500 can comprise first end 1510, second end 1520, plurality of openings 1530, and first 1550, second 1560, and third 1570 bores. Plurality of bolts 1540 with plurality of nuts 1532 can be used to detachably connect reinforcement plate 1500 to body 710 of plug drive system 700. In various embodiments each of the plurality of bolts 1540 can include first 1542 and second 1544 threaded areas. In various embodiments a second plurality of nuts 1536 can be used to lock plurality of bolts 1540 to flange 750 of plug drive system 700.

The body 200 of the hydraulic choke valve 100 can be heavy walled steel with an axial passage extending from inlet 110 to outlet 120. Both the inlet 110 and outlet 120 flow passages can be provided with concentric mounting grooves for metal ring gasket seals (not shown) and concentric hole circles for the mounting of the choke to connecting piping by means of threaded studs and nuts (not shown). The outlet flow passage has a terminal flange. The bolted and ring gasketed inlet and outlet connections are mateable with standard American Petroleum Institute (API) flange connections typically used for high pressures in the oilfield.

Figure 18:
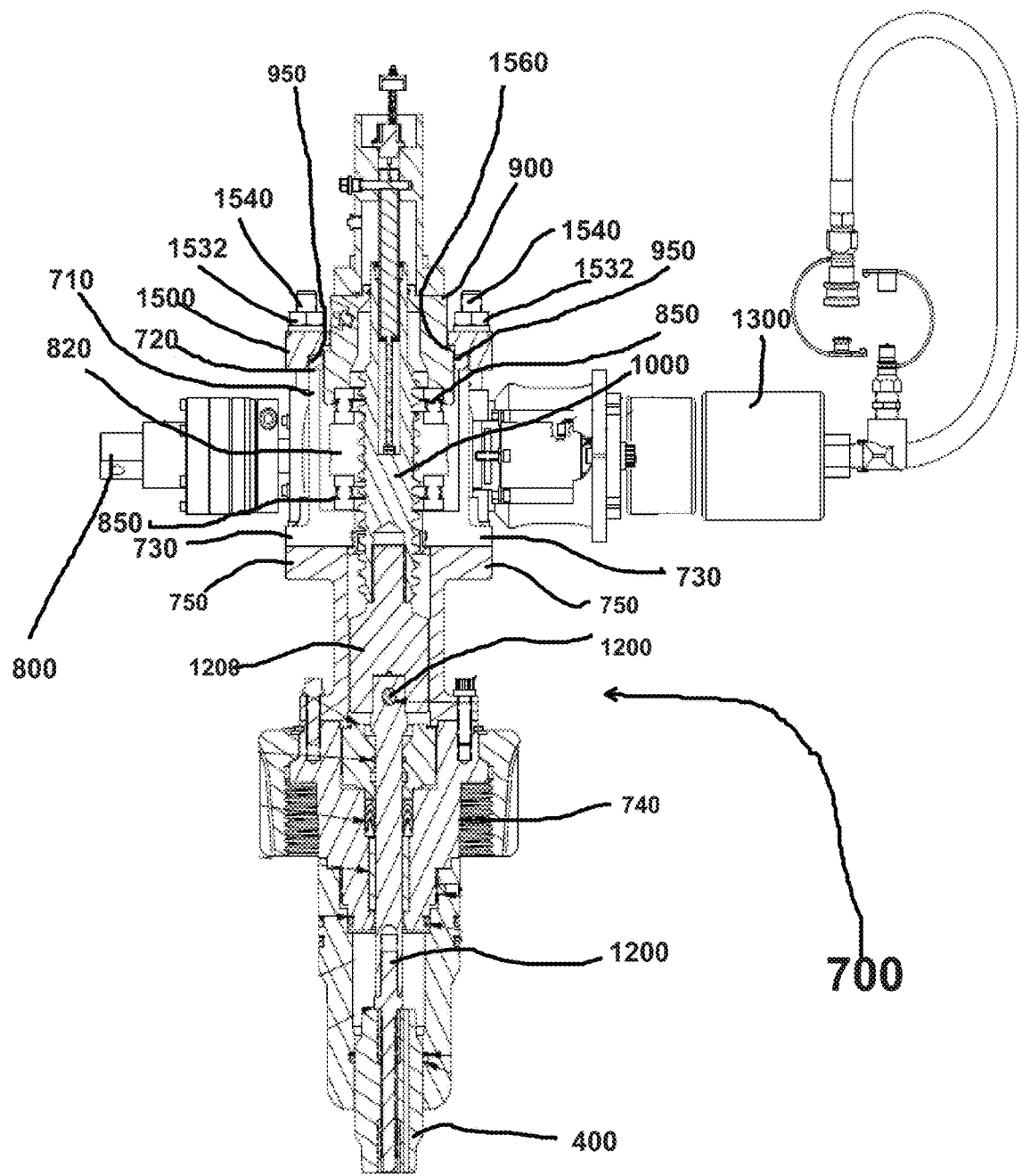
FIG. 18 is a sectional view of the plug drive system of FIG. 17 taken through lines 18-18 of FIG. 17.
Figure 19:
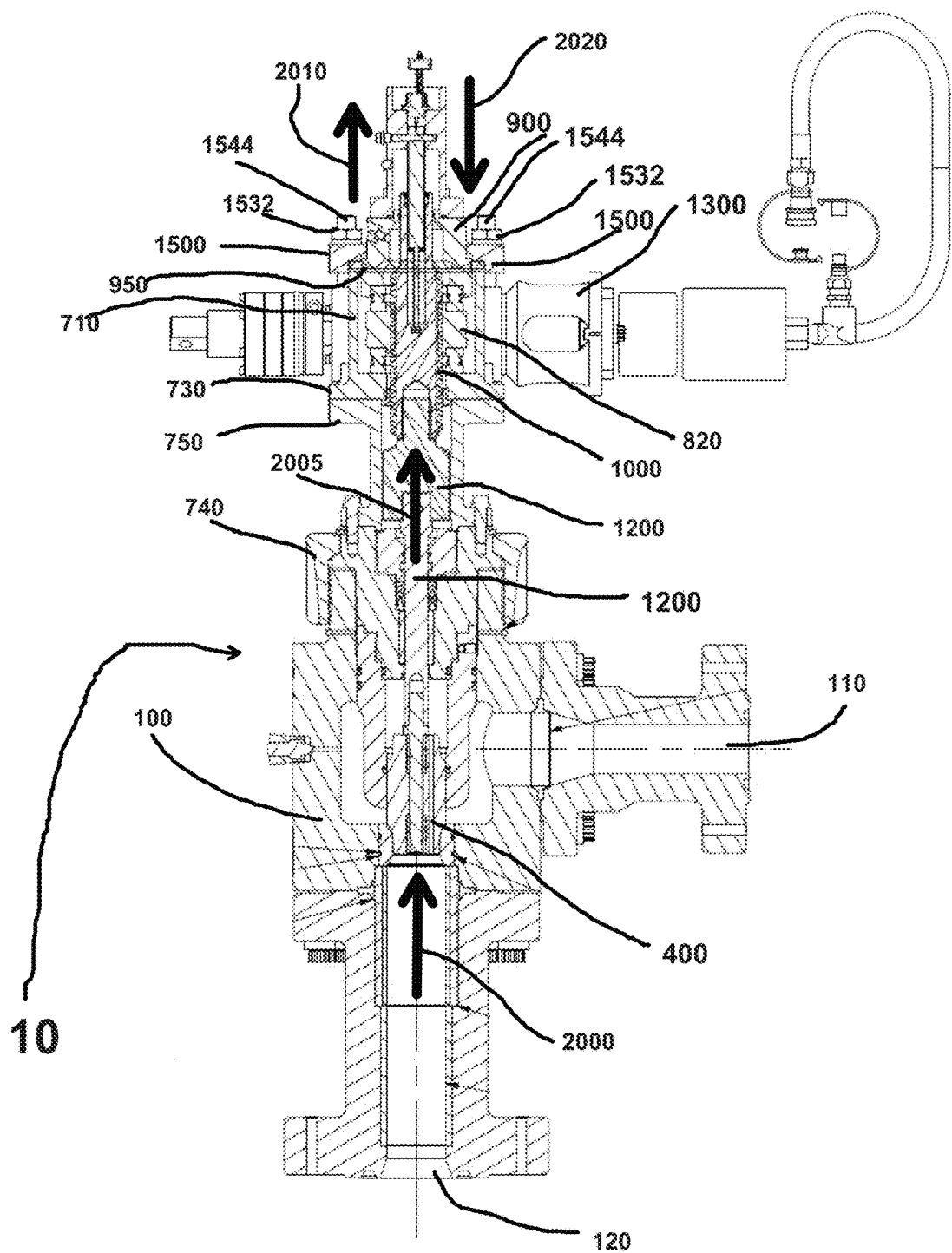
FIG. 19 is a sectional view of the plug drive of FIG. 13 attached to a choke valve and taken through lines 19-19 of FIG. 13.

FIG. 18 illustrates the internal arrangements of the choke 10. Inlet flow passage 110 into body 200 is radial to the axis of the through axial passage 150 which extends from actuator end to outlet 120 end of body 200.

The flow passage from the cavity 150 to outlet 120 is restricted by choke plug 400. Choke plug 400. Choke plug 400 can seal against seat 160. Choke plug 400 can have one or more internal flow passages parallel to but offset from its longitudinal axis and connecting from one side to the other in order that it will not fluid lock and will be exposed to balanced opening forces when it is fully or nearly closed.

Choke plug 400 is located on shaft 1200, which can be a cylindrical rod extending upwardly towards driven axial shaft 1000. The portions of the choke valve 100 exposed to high velocity flow (such as the plug 40 and seat 160) will typically be constructed of sintered tungsten carbide, a ceramic material, or will be hardfaced with a suitable wear resistant material, such as Stellite 3™

Primary actuator drive 1300 is not described in detail, since such actuators are in very broad use and are well known to those skilled in the art. Only a general description of one type of actuator is given here. Actuator drive 1300 may be manual or either electrically, hydraulically, or pneumatically operated. In most cases, actuator 1300 will be powered and also provided with a separate manual override. Actuator drive 1300 can be rotary device powered by an electric power line or hydraulic or pneumatic hoses (not shown).

Although not shown, coaxial with and on the opposed side of primary actuator drive 1300 can a selectably manually engageable handwheel which is normally declutched, but can be used to operate the internal worm gear drive 810 of plug drive system 700 if primary actuator drive 1300 malfunctions. The handwheel shaft can be supported in a bearing (not shown) in the external boss projecting from plug drive system 700 on the handwheel side. Internal to plug drive system 700 body 710 is the worm gear set mount in which are a mounted a driven gear 820 and a screw drive worm gear 810 driven by shaft 800 which shaft 800 can be operably connected to both primary actuator drive 1300 and alternative manual/handwheel drive.

Driven axial shaft 1000 provides a linear/axial output of plug 400 from rotation of primary actuator drive 1300. Driven axial shaft 1000 can have a male acme threaded area 1100.

Shaft 800 is directly attached to screw drive worm gear 810. Both gears 810 and 820 can be supported on bearings in plug drive body 710 and prevented from shifting axially by their mountings therein. Driven gear 820 is driven on its outer periphery by driving worm gear 810. Driven gear 820 can include female acme drive thread 830 which can be threadably connected to driven axial shaft 100 (which includes threaded area 1100). Plug drive system 700 can provide a torque multiplication and speed reduction between primary actuator drive 1300 and driven axial shaft 1000 (via the gear reduction between driving worm gear 810, driven gear 820, and threadably connected driven axial shaft 1000). Such gear reduction can also resist backdriving of actuator 1300 by thrusts on the actuator shaft 1200 from plug 400. To resist axial rotation of driven axial shaft 1000, an anti-rotation system can be used.

Operation

Choke valve 100 is operated by non-rotating linear up and down stroking of plug 400 driven by primary drive actuator 1300. Plug 400 can be pressure balanced through communication of fluid pressure from one end of plug 400 to the other through the internal flow passages of the plug. This pressure balancing of the plug permits the pressure on plug shaft 1200 to be reduced and, accordingly, the pressure loads typically expected on plug drive system 700 will be correspondingly reduced. This is because the pressure in the outlet 120 of the choke acts only on the cross-sectional area of the shaft 1200; the pressure load on the actuator is the product of the outlet pressure and the shaft 1200 area. The consequence of this is that smaller actuators can be used to control a given flow condition, when compared to the conventional unbalanced chokes.

Normally, pressures in the outlet 120 of choke 100 are much lower than in the inlet 110. When choke 100 is in good condition, it will reliably seal when the sealing face of plug 400 is pressed against the seat 160. Since the outlet 120 of the choke is typically vented, the pressure on the outlet line would thus be very low in such a case. Even when the choke 100 is opened and exposed to a high inlet 110 pressure, it is typically operated in a manner such that a very, high pressure drop is taken across the flow orifice opened between the plug 400 and seat 160, with the result that the outlet pressure still would be low. Thus, in the normal situation, the axial loads transmitted to shaft 1200 and hence to primary drive actuator 1300 through the connection of the shaft 1200 to the actuator screw 130 are low.

In the event of a stoppage in the outlet 120 or some other flow upset, such as a downstream water hammer or the opening of a valve at the wrong time, very high pressures can be produced in the outlet 120 of the choke valve 100. In such an instance, a high pressure induced axial compression load is translated to shaft 1200, driven gear 820, and ultimate to bonnet 900 of choke valve 100. This high load has the potential to damage bonnet 900 and/or plug drive body 710.

In FIGS. 1 and 2 such high axial load is schematically indicated by arrows 2000 and 2010. The response to such axial load is schematically indicated by arrow 2020. In this embodiment bonnet 900 and body 710 of plug drive system 700 muss absorb and counteract the entire axial loading schematically indicated by arrow 2000. With such axial loading there is a risk that body 710 and/or the threaded connection between body 710 and bonnet 900 will fail.

However, it is apparent that the compressive reaction load path from shaft 1200 to bonnet 900 and/or plug drive body 710, can be at least partially absorbed by detachably connected reinforcement plate 1500 to plug drive system 700. Such reinforcement will increase the thrust load bearing capacity of housing 710 and/or bonnet 900 of plug drive system 700.

Various embodiments permit the use of a smaller, less expensive plug drive bodies 710 and/or bonnets 900 for plug drive system 700 while at the same time greatly reducing the likelihood of failure of these bodies 710 and/or bonnets 900 due to an incident of high back-pressure on the choke 1000 outlet 120. This and other advantages will be readily apparent to those familiar with the art.

FIG. 10 is an exploded perspective view of a reinforcement plate 1500 being detachably connected to the plug drive system 700.

Figure 13:
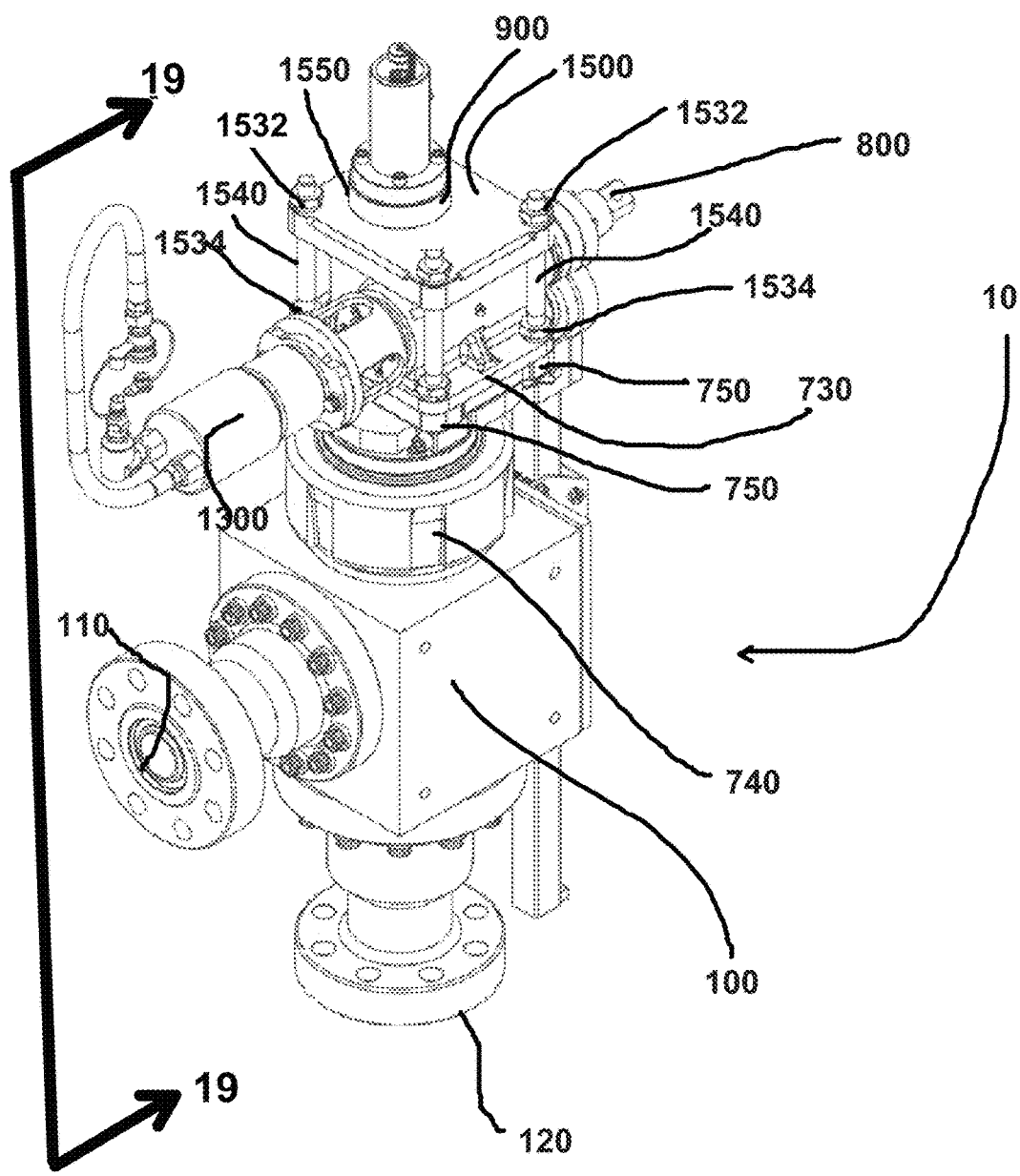
FIG. 13 is an upper perspective view of the connected reinforcement plate now detachably connected to the plug drive system of FIGS. 1 and 2, and with the plug drive system connected to a choke valve.
Figure 14:
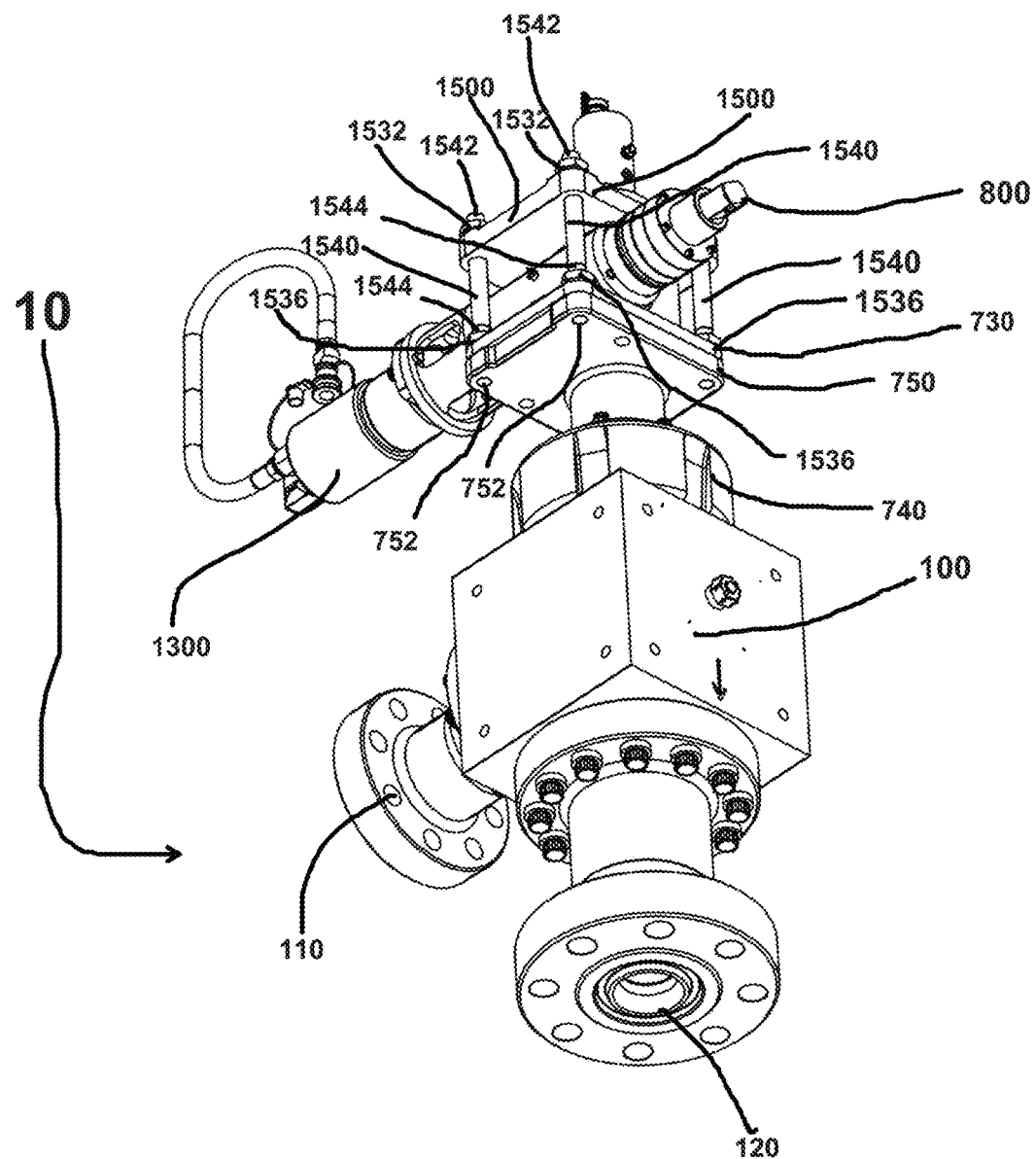
FIG. 14 is a lower perspective view of the connected reinforcement plate now detachably connected to the plug drive system of FIGS. 1 and 2, and with the plug drive system connected to a choke valve.
Figure 15:
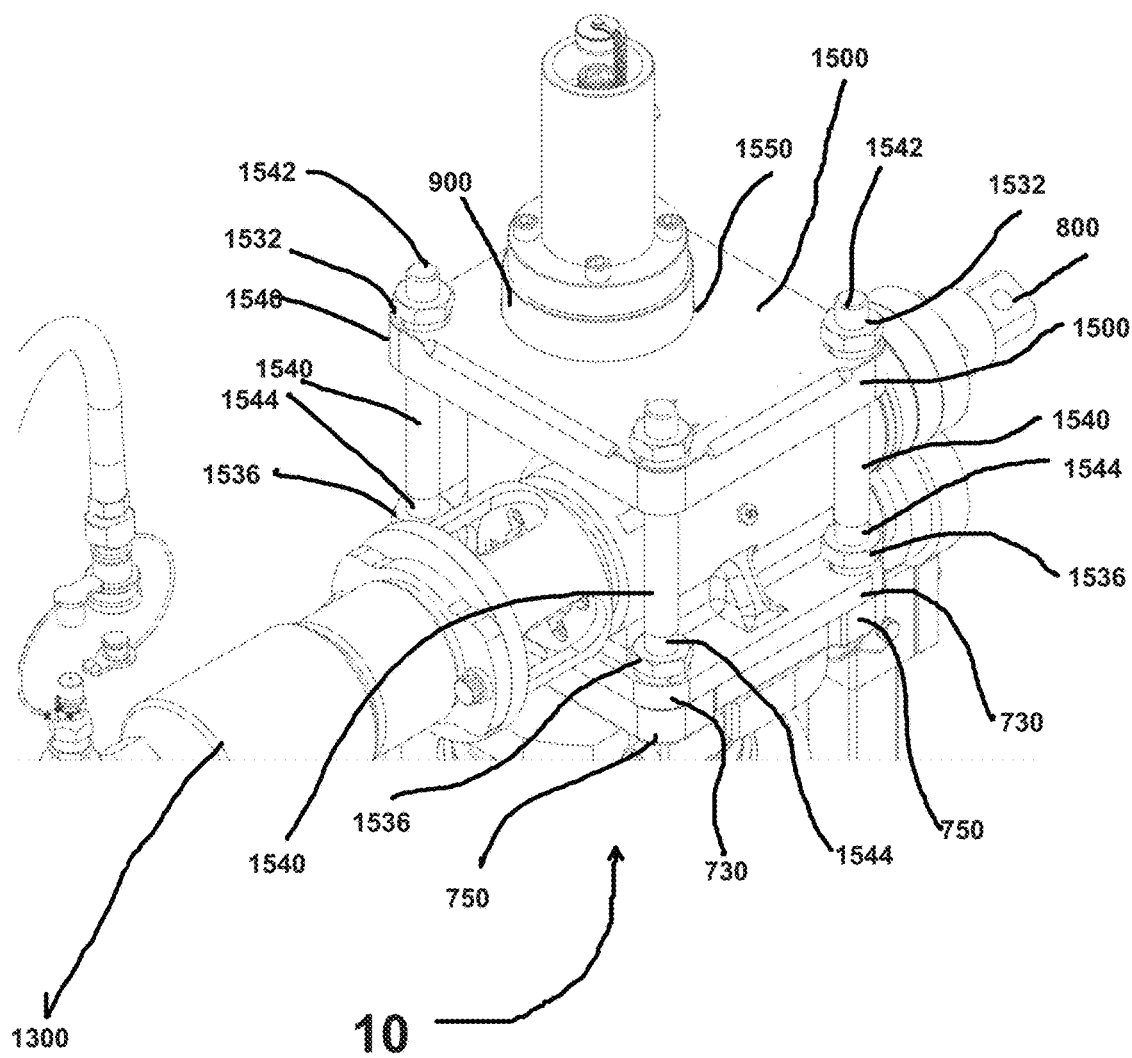
FIG. 15 is a close up upper perspective view of the connected reinforcement plate now detachably connected to the plug drive system of FIGS. 1 and 2.
Figure 16:
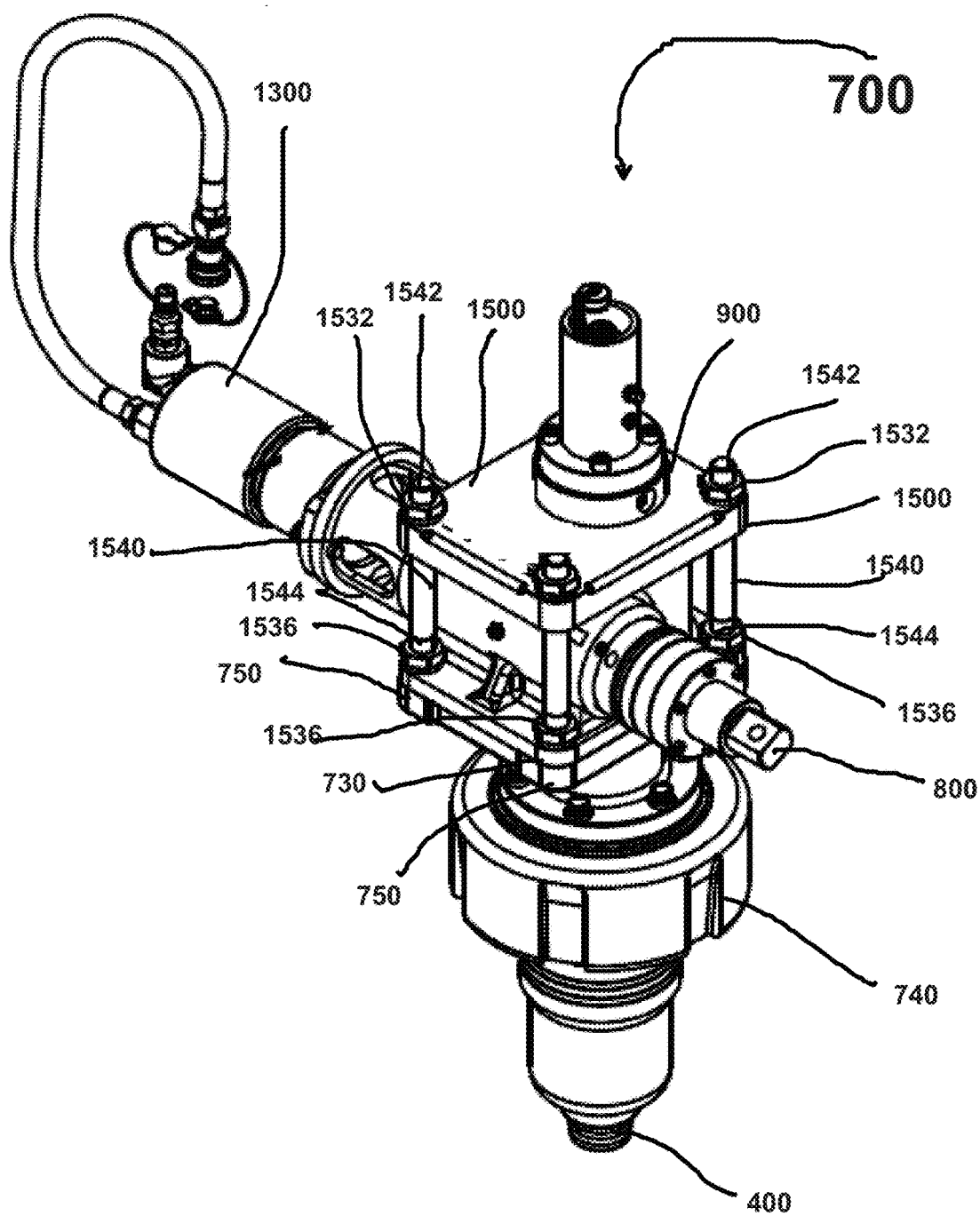
FIG. 16 is another close up upper perspective view of the connected reinforcement plate now detachably connected to the plug drive system of FIGS. 1 and 2.
Figure 17:
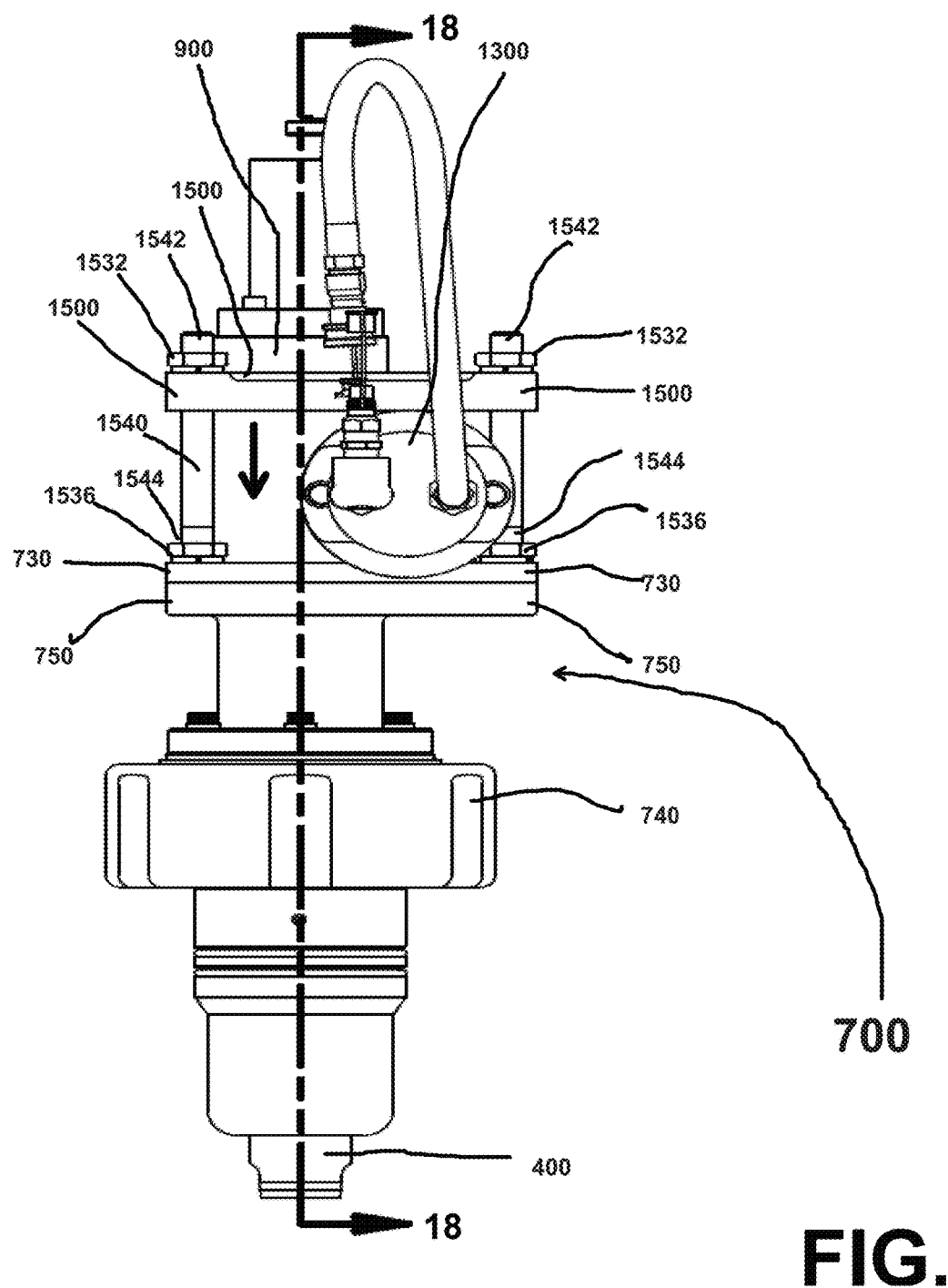
FIG. 17 is an upper perspective view of the connected reinforcement plate now detachably connected to the plug drive system of FIGS. 1 and 2.

FIG. 13 is an upper perspective view of the connected reinforcement plate now detachably connected to the plug drive system 700, and with the plug drive system 700 being connected to a choke valve 100. FIG. 14 is a lower perspective view of the connected reinforcement plate 1500 now detachably connected to the plug drive system 700, and with the plug drive system 700 being connected to a choke valve 100. FIG. 15 is a close up upper perspective view of the connected reinforcement plate 1500 now detachably connected to the plug drive system 700, and with the plug drive system 700 being connected to a choke valve 100. FIG. 16 is another close up upper perspective view of the connected reinforcement plate 1500 now detachably connected to the plug drive system 700, and with the plug drive system 700 being connected to a choke valve 100. FIG. 15 is an upper perspective view of the connected reinforcement plate 1500 detachably connected to the plug drive 700, and with the plug drive system 700 not being connected to a choke valve. FIG. 17 is a side view of the connected reinforcement plate 1500 detachably connected to the plug drive system 700. FIG. 18 is a sectional view of the plug drive 700 taken through lines 18-18 of FIG. 17. FIG. 18 is a sectional view of the plug drive 700 attached to choke valve 100 taken through lines 18-18 of FIG. 17.

Figure 20:
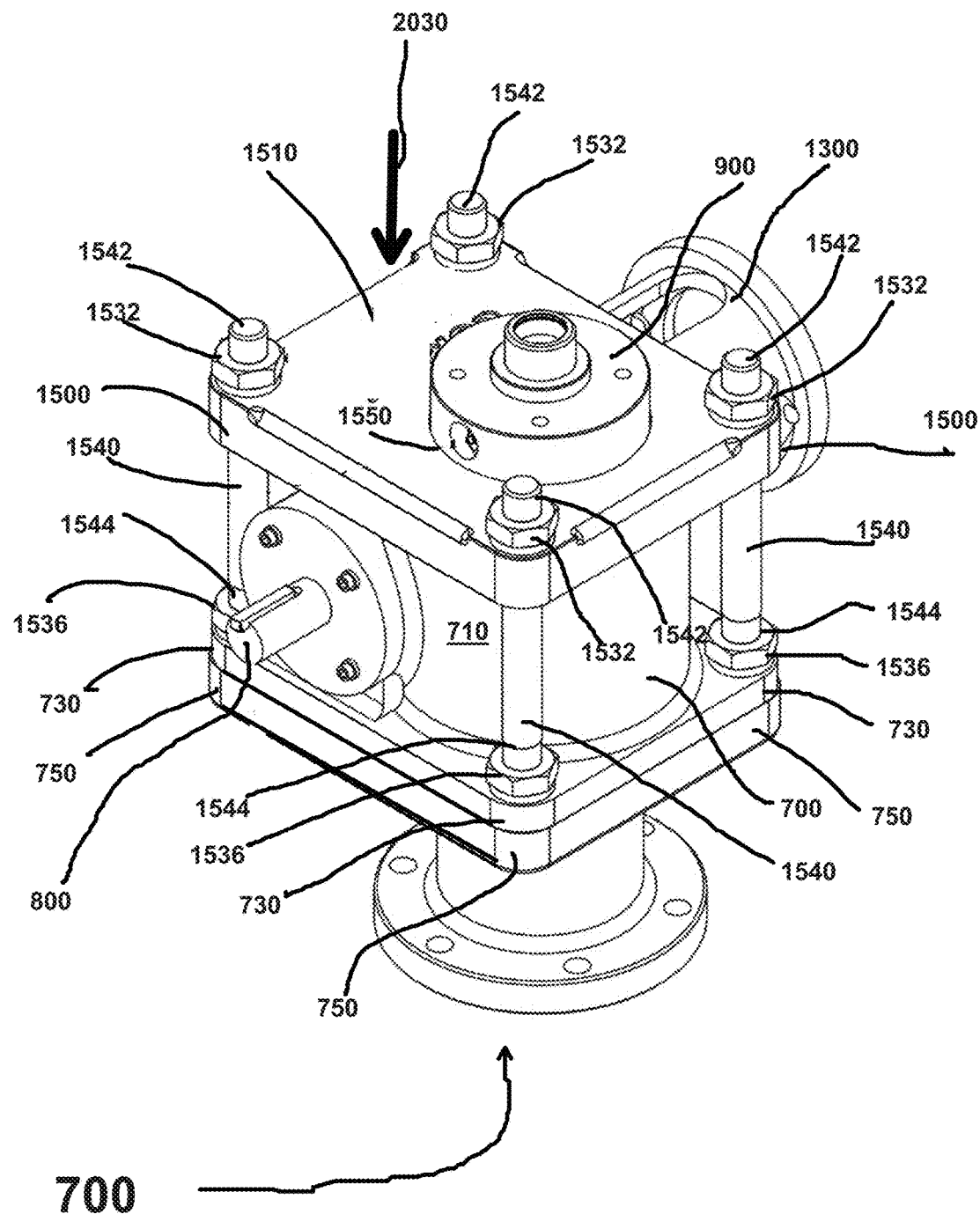
FIG. 20 is an upper perspective view of the connected reinforcement plate now detachably connected to the plug drive system of FIGS. 1 and 2, and with the primary actuator drive removed.
Figure 21:
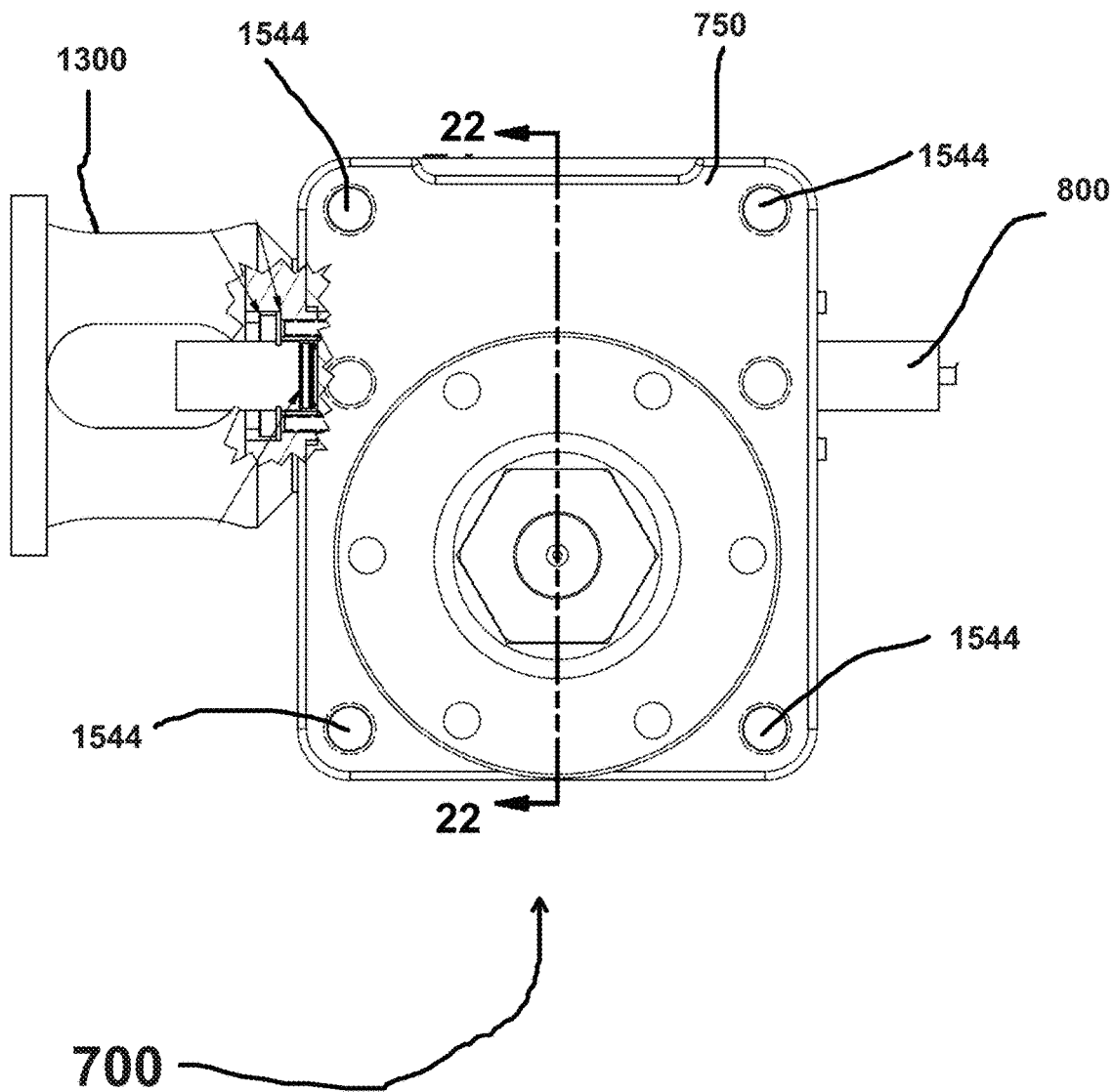
FIG. 21 is a bottom view of the plug drive system of FIG. 20.
Figures 22, 23:
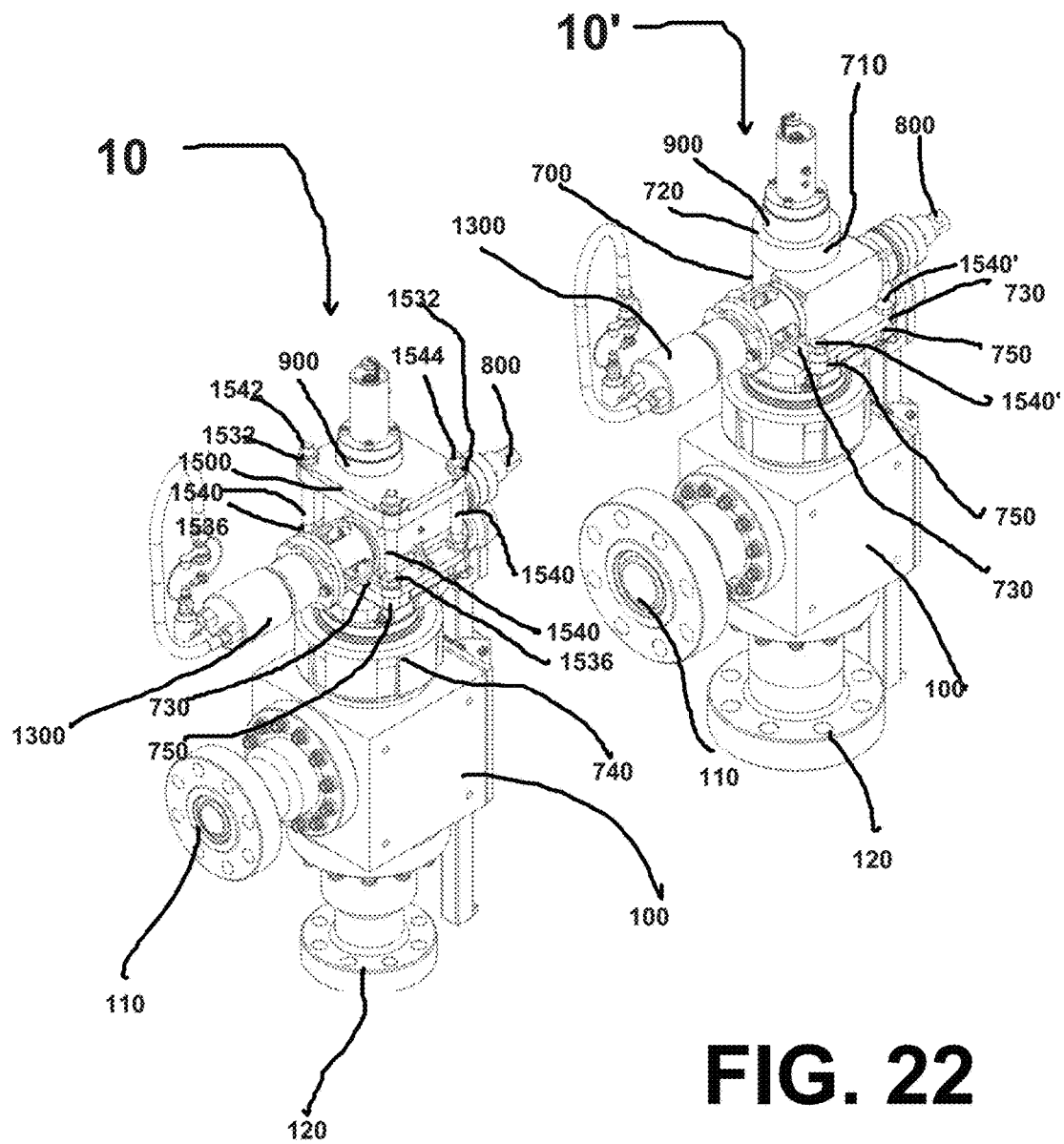
FIG. 22 is a perspective view of the plug drive system of FIGS. 1 and 2, and with the plug drive system connected to a choke valve.
FIG. 23 is perspective view of the connected reinforcement plate now detachably connected to the plug drive system of FIGS. 1 and 2, and with the plug drive system being connected to a choke valve.

FIG. 20 is an upper perspective view of the connected reinforcement plate 1500 now detachably connected to the plug drive system 700, and with the primary actuator drive 1300 removed. FIG. 21 is a bottom view of the plug drive system 700. FIG. 22 is a sectional view of the of the connected reinforcement plate 1500 now detachably connected to the plug drive system 700 taken through lines 22-22 of FIG. 21.

Instead of body 710 and/or bonnet 900 absorbing the entire axial loading from plug 400, reinforcement plate 1500 will absorb most and transfer such absorbed loading to plurality of bolts 1540 which in turn transfer such loading to second end 730 of plug drive system 700 and/or flange 750.

FIGS. 22 and 23 are perspective views of the connected reinforcement plate 1500 now detachably connected to the plug drive 700, and with the plug drive system 700 being connected to a choke valve 100, along with the same system 10' but omitting the reinforcement plate 1500.

As schematically shown in FIG. 1, prior art systems have arrow 2000 indicating axial force from plug 400 transmitted to plug shaft 1200, then to driven axial shaft 1000, and bonnet 900, and ultimately absorbed by plug drive body 710 and bonnet 900. In these prior art systems body 710, bonnet 900, and/or the threaded connection between body 710 and bonnet 900 can fail. In one embodiment (shown in FIGS. 10, 17, 18, and 21), a bonnet 950 can be threadably attached to a threaded locking ring 950 which locking ring is axially reinforced by reinforcement plate 1500. In this embodiment bonnet 900 can also be threadably connected to body 710 of plug drive system 700. As shown in FIG. 21 locking rind 950 can sit in first bore 1550 of plate 1500 and enlarged area 909 of bonnet 900 can sit in second bore 1560 of plate 1500, while bonnet 900 extends through third bore 1570 of plate 1500.

In this embodiment a gap between shoulder 1562 of second bore 1560 and shoulder of enlarged area 909 of bonnet 900 such that a secondary protection is provided if the threaded connection between bonnet 900 and body 710/locking ring 950 fails. If such failure occurs, shoulder 1562 of second bore 1560 will contact shoulder of enlarged area 909 of bonnet preventing a catastrophic failure of plug driving system 700.

As schematically shown in FIG. 18, reinforcement plate 1500 can reduce the amount of reaction force from plug 400 transmitted to plug shaft 1200, then to driven axial shaft 1000, and bonnet 900, and ultimately absorbed by plug drive body 710 and bonnet 900. With reinforcement plate 1500, instead of the full reaction force being ultimately absorbed by plug drive body 710 and 900, arrow 2010 schematically indicates that plate 1500 absorbs a large part of this force and arrow 2020 schematically indicates that the absorbed reaction force is transmitted back down plurality of bolts 1540 and into second end 730 of plug drive system 700 and/or flange 750 with such amount of transmitted force reducing the amount of reaction force ultimately absorbed by plug drive body 710, bonnet 900, and the connection between plug drive body 710 and bonnet 900.

The following is a list of reference numerals:

| LIST FOR REFERENCE NUMERALS | |
|---|---|
| (Reference No.) | (Description) |
| 10 | hydraulic choke valve system |
| 100 | hydraulic choke valve |
| 110 | inlet |
| 120 | outlet |
| 150 | axial passage |
| 160 | seat |
| 200 | body |
| 300 | central cylindrical neck outlet |
| 400 | choke plug |
| 700 | plug drive system |
| 710 | plug drive body |
| 720 | first end |
| 730 | second end |
| 740 | threaded attachment collar |
| 750 | flange |
| 752 | threaded openings |
| 760 | plug shaft |
| 800 | input shaft |
| 802 | first end |
| 804 | second end |
| 810 | driving worm gear |
| 820 | driven gear |
| 830 | interior threads |
| 850 | thrust bearings |
| 900 | bonnet |
| 904 | first end |
| 908 | second end |
| 909 | enlarged area |
| 912 | threaded area |
| 918 | shoulder |
| 950 | locking ring |
| 952 | first end |
| 954 | second end |
| 956 | threaded area |
| 1000 | driven axial shaft |
| 1100 | threaded area |
| 1200 | plug shaft |
| 1300 | primary actuator drive |
| 1350 | secondary actuator drive |
| 1500 | detachably connectable reinforcing plate |
| 1510 | first end |
| 1520 | second end |
| 1530 | plurality of openings |
| 1532 | plurality of nuts |
| 1536 | second plurality of nuts |
| 1540 | plurality of bolts |
| 1542 | first threaded area for bolts |
| 1544 | second threaded area for bolts |
| 1550 | first bore |

-continued

LIST FOR REFERENCE NUMERALS

| (Reference No.) | (Description) |
|---|---|
| 1560 | second bore |
| 1562 | shoulder |
| 1570 | third bore |
| 1572 | shoulder |
| 2000 | arrow |
| 2005 | arrow |
| 2010 | arrow |
| 2020 | arrow |
| 2030 | arrow |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

What is claimed is:

1. A choke valve comprising:
   a body having an axial through hole and a radial entry port;
   a valve seat coaxially housed in the body axial through hole on a first side of the radial entry port;
   a pressure balanced valving member axially reciprocal within the body axial through hole between a first sealing position bearing against the valve seat and a second position spaced away from the seat;
   a plug drive housing operably connected to the valving member; and
   a detachably connected reinforcement member detachably connected to the plug drive housing and increasing an axial load that the plug drive housing can take before failure of the plug drive housing,
   wherein the reinforcement member is a reinforcement plate, the plug drive housing has a height, and the plate is detachably connected to the plug drive housing via a plurality of spaced apart threaded fasteners,
   wherein the plug drive housing includes a bonnet threadably connected to the housing, and the bonnet includes a ring which is threadably connected to the bonnet, and the ring is located between the reinforcement plate and the housing, and wherein the plate includes first and second annular and concentric shoulders with the first shoulder having a larger radius of curvature compared to the second shoulder, and
   the ring rests in and remains in contact with the first shoulder, and
   the bonnet rests in but is longitudinally spaced apart from a second shoulder of the ring to form a gap between an upper surface of the bonnet and an inner surface of the second shoulder,
   wherein before failure, the upper surface of the bonnet will transfer a load to the reinforcement plate causing the reinforcement plate to transfer this load to the housing through the plurality of threaded fasteners.

2. The choke valve of claim 1, wherein longitudinal movement of the bonnet causes the bonnet to contact the second shoulder.

3. The choke valve of claim 1, wherein the actuator housing includes an actuator which is manually, electrically, hydraulically or pneumatically operated.

4. The choke valve of claim 1, wherein the valving member has at least one fluid channel traversing the valving member.

5. A choke valve comprising:
   a body having an axial through hole passing from a first side of the body to a second side of the body, an outlet passageway coaxially aligned with the through hole and positioned at the first side of the body, and a radial inlet port intersecting the through hole between the first and second sides of the body;
   a valve seat coaxially housed in the through hole between the inlet port and the outlet passageway; a pressure balanced valving member axially reciprocable within the through hole between a first position bearing against the valve seat and a second open position spaced away from the valve seat;
   a plug drive having a housing, the housing being attached to the second side of the body, the plug drive housing having an axially reciprocating plug drive shank for reciprocal moving the valving member between the first position and the second position; a plug drive reinforcing member detachably connected to the plug drive housing, the reinforcing member comprising a plate section with an opening allowing the plug drive housing to partially extend therethrough; and
   a first end of a stem positioned in a socket in one end of the plug drive shank; whereby whenever the plug drive shank is subjected to a fluid pressure in excess of a predetermined value from the outlet passageway the plug drive reinforcing member will reinforce the housing of the plug drive, wherein the reinforcement member is a reinforcement plate, the plug drive housing has a height, and the plate is detachably connected to the plug drive housing via a plurality of spaced apart threaded fasteners, wherein the plug drive housing includes a bonnet threadably connected to the housing, and the bonnet includes a ring which is threadably connected to the bonnet, and the ring is located between the reinforcement plate and the housing, and wherein the plate includes first and second annular and concentric shoulders with the first shoulder having a larger radius of curvature compared to the second shoulder, and the ring rests in and remains in contact with the first shoulder, and the bonnet rests in but is longitudinally spaced apart from a second shoulder of the ring to form a gap between an upper surface of the bonnet and an inner surface of the second shoulder,
   wherein before failure, the upper surface of the bonnet will transfer a load to the reinforcement plate which transfers this load to the housing via the plurality of spaced apart threaded fasteners.

6. The choke valve of claim 5, wherein longitudinal movement of the bonnet causes the bonnet to contact the second shoulder.

7. The choke valve of claim 5, wherein the actuator housing includes an actuator which is manually, electrically, hydraulically or pneumatically operated.

8. The choke valve of claim 5, wherein the valving member has at least one fluid channel traversing the valving member.

* * * * *